Sept. 25, 1962 R. H. HERRON ETAL 3,055,769
HIGH TEMPERATURE ANTIFRICTION SEAL, MATERIAL, AND
METHOD OF MANUFACTURE
Filed Dec. 8, 1958

INVENTORS
ROBERT H. HERRON
JAMES W. VOGAN
DAVID M. SCRUGGS
BY
William P. Hickey
ATTORNEY

United States Patent Office 3,055,769
Patented Sept. 25, 1962

3,055,769
HIGH TEMPERATURE ANTIFRICTION SEAL, MATERIAL, AND METHOD OF MANUFACTURE
Robert H. Herron, James W. Vogan, and David M. Scruggs, South Bend, Ind., assignors to The Bendix Corporation, a corporation of Delaware
Filed Dec. 8, 1958, Ser. No. 778,724
18 Claims. (Cl. 117—46)

The present invention relates to antifriction materials for use at elevated temperatures at which they must run dry, and more particularly to rotary seals and bearings for use under such conditions.

An object of the present invention is the provision of a new and improved antifriction material for use in seals and bearings at elevated temperatures at which they must run dry.

A more specific object of the present invention is the provision of a new and improved antifriction material for use as rotary seals for heat exchangers used in conjunction with automotive gas turbine engines and high velocity rubbing seals in aircraft jet engines, and which seals are subjected both to the reducing conditions of its products of combustion, and the oxidizing conditions of air at elevated temperatures.

A still further object of the present invention is the provision of a new and improved material of the above described type which can be flame sprayed in comparatively thin adhering coatings to backing structures made from inexpensive metals such as the carbon steels and stainless steels.

Other objects and advantages will become apparent to those skilled in the art to which the invention relates from the following description of applicants' preferred materials and methods of fabricating the same, as described in conjunction with the attached drawing forming a part of this specification, and in which.

Figures 1, 2:
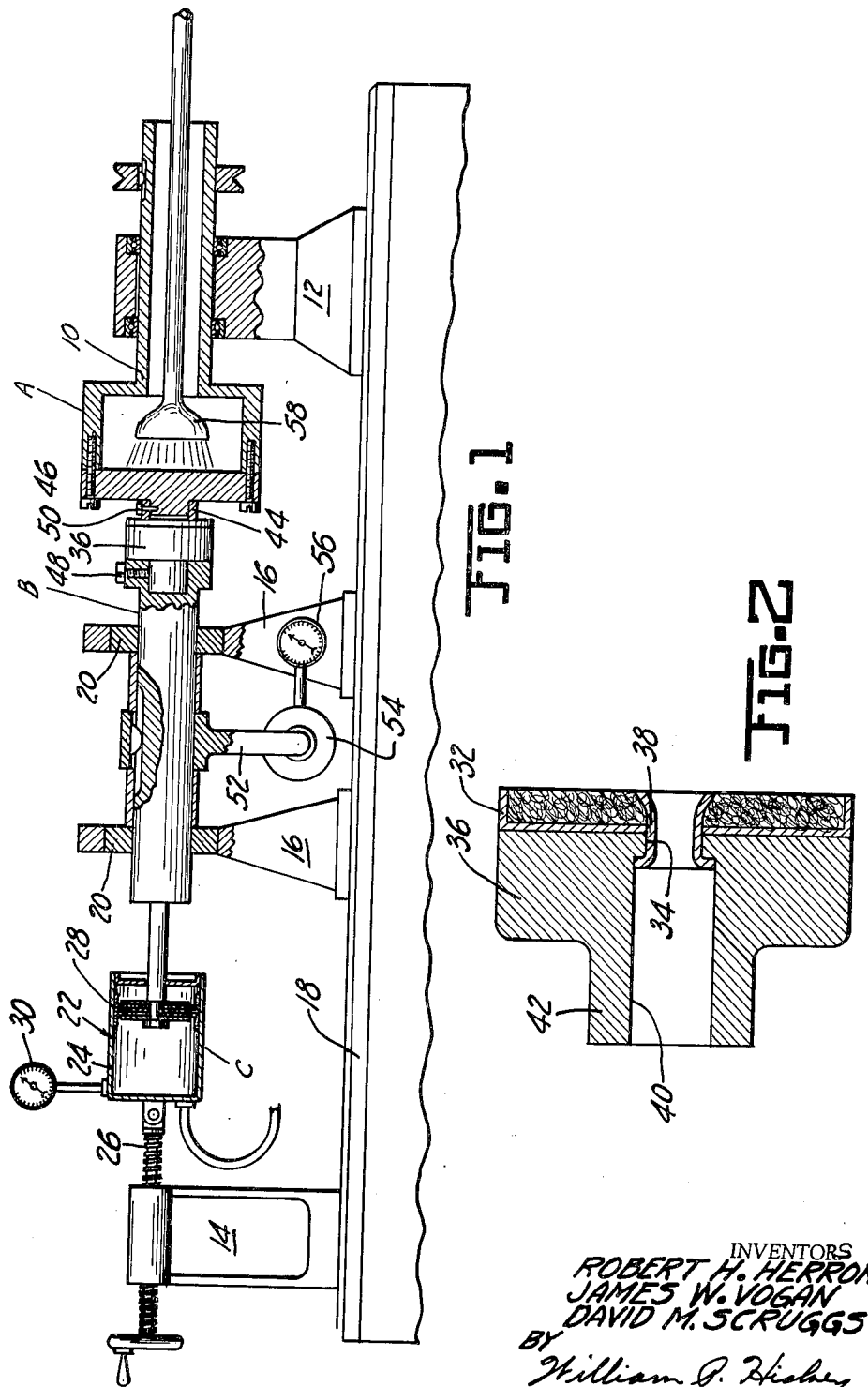
FIGURE 1 is a schematic sectional view of equipment used to determine coefficients of friction of various materials.
FIGURE 2 is a cross sectional view of a prepared sintered powdered sample mounted in its fixture for testing in the structure shown in FIGURE 1.

The machine shown schematically in FIGURE 1, was built to determine both hot and cold coefficients of friction for the various latter described materials. The machine was made from an existing lathe and generally comprises a heated head A mounted on the tubular driven spindle 10 of the head stock 12 of the lathe. In between the head stock 12 and the tail stock 14 is a pair of supports 16 which are also mounted on the lathe bed 18. A quill B is mounted in sleeve bearings 20 that in turn are carried by the supports 16; and the quill B is mounted in such a way as to be slidable longitudinally through the bearings 20. In between the quill B and tail stock 14 is a hydraulic cylinder 22—the body 24 of which is carried by the tail piece 26 and the piston 28 of which is carried by the quill B. A pressure gauge 30 is connected to the cylinder 22, and suitable means, not shown, is provided for supplying predetermined pressure to the cylinder 22 to provide biasing force of the quill B against the head A.

In the following specification the words sintered materials will be understood to include materials that have been bonded together by heating in a furnace at temperatures below insipient fusion, or materials bonded together by flame spraying. Those materials which are to be furnace sintered are first pressed into a copper cup 32 having a centrally located hole 34 therethrough. The cup containing the material is then sintered in a furnace, coined, and mounted to an adapter 36 by means of a tubular rivet 38. The tubular rivet extends through the opening hole 34 and aligned opening in the sintered material into a stepped opening 40 in the adapter 36. The adapter is swaged both against the sidewalls of the stepped opening 40 and the sintered material to lock the cup to the adapter.

The adapter 36 contains an axially extending boss 42 on its end opposite to that which carries the cup 32—which boss in turn is adapted to be received in an axially extending opening in the end of the quill B facing the head A. An annular ring 44 of the material which the sintered material is to rub against, is fitted over an axially extending boss 46 on the head A, and the adapter 36 and ring 44 are locked in place by set screws 48 and 50, respectively.

The spindle 10 of the lathe is adapted to be driven in the usual manner, and torque transmitted from the ring 44 to the sintered material in turn tends to rotate the quill B. Turning moment on the quill B is transmitted through a torque arm 52 keyed to the quill B to a hydraulic cylinder 54 to develop pressure therein which is read on the gauge 56. The quill B can be slid longitudinally through the torque arm 52 and bearing 20 to permit changing of the adapters 36; and a suitable gas burner 58 is slid through the hollow spindle 10 to heat the head A, and in turn heat ring 44 to any desired temperature.

Tests of flame sprayed material are had by spraying the materials into a cup 32 which has had its sides removed and has been mounted in an adapter 36. The face of the sprayed material is ground flat, and is thereafter tested in the same manner as are the furnace sintered materials.

In the tests which are about to be described, the spindle 10 is rotated at speeds below approximately 450 r.p.m.; and since the ring 44 has a mean diameter of approximately 1½", gives rubbing speeds below approximately 150 f.p.m. Testing materials dry for extended periods of time at this slow speed and at temperatures above 700° F. are considered to be extreme conditions for which other materials including the wrought alloys, cermets, ceramics, and various metal ceramics exhibit high friction (above 0.500), galling or short life. It has been generally recognized by those skilled in the powdered metallurgy art that adding a ceramic material to powdered metal structures produces materials having higher coefficients of friction than they would otherwise have. It is believed quite unexpected therefore that applicants should find a powdered metal material containing a ceramic to have better antifriction properties for certain applications and conditions than prior art materials. In general applicants' new and improved materials produce long life with substantially no wear when run dry at elevated temperatures above approximately 1000° F. At these temperatures the coefficient of friction decreases below 0.100 when rubbed against stainless steel above approximately 1000 feet per minute. When run at room temperature their coefficients become somewhat higher, but are less than .500 and do not gall appreciably even though run dry. Rotary seals for heat exchangers for automotive gas turbine engines made of these materials are the first seals to have given acceptable performance. Inasmuch as gas turbines are made feasible for automotive use only by the incorporation of heat exchangers, and heat exchangers of small and compact design can be made by designs using rotary seals, the feasibility of automotive gas turbine engines is now assured.

Lab testing under simulated conditions has shown these materials to be substantially superior to other materials for uses as rotary heat exchanger seals for automotive gas turbine engines. The satisfactory adaptation of these seal materials assures the automotive industry of the properly designed heat exchanger unit necessary for the commercial acceptance of the gas turbine engine.

Tests of various materials on the above described machine show that sintered or flame sprayed powdered metal materials containing molybdenum, when run dry, give dynamic coefficients of friction at or above temperatures of approximately 1000° F. which are lower than any known materials having appreciable life used heretofore under these conditions. It appears that the molybdenum oxides do provide a good high temperature lubricant.

The tests made, further indicate that the inclusion of MgO into the powdered metal material in amounts above approximately 3% by weight noticeably decreases the coefficient of friction of the materials at room temperatures; and adds appreciable life to materials when operated at high temperatures. It appears therefore that that MgO serves the function of supporting the opposing shaft, or sliding surface, above the matrix materials; while the matrix material supports the MgO and at the same time provides the high temperature lubricant. It further appears that the formation of the molybdenum oxide lubricant is a time-rate function; and that the MgO stabilizes the surface to prevent too rapid an oxidation of the molybdenum.

Testing further shows that materials made only from Mo and MgO do not have sufficient structural strength at ordinary sintering temperatures to be used as a seal or bearing structure; and that other powdered materials must also be used to provide the necessary structural strength. Many materials have been used, as for example, copper, stainless steel, and nickel; but applicants have found that powdered iron provides the necessary structural strength while giving lower coefficients of friction, at both room and elevated temperatures, than did other strengthening materials tested. It is believed that the iron also oxides, but to a lesser extent than the Mo, to produce some beneficial lubricating effect at both high and low temperatures. In this respect the Mo controls the oxidation of the Fe to prevent formation of the hard abrasive $Fe_3O_4$, and insures that the beneficial FeO or $Fe_2O_3$ is provided. Once the Fe has slightly oxidized at the rubbing surface, the opposing surface is then supported by the MgO.

Applicants' preferred pressed and furnace sintered powdered material was prepared and tested as follows:

EXAMPLE I

A sintered powdered metal button was made by thoroughly mixing a molybdenum powder of approximately 325 mesh, iron powder of a mixture of from 80 mesh to 325, and MgO powder of a mixture of from 20 mesh to 90 mesh in the ratios of approximately 71.3% Mo, 23.7% Fe, and 5.0% MgO. The resulting powder was compressed into a cup at approximately 100,000 p.s.i.; was then furnace sintered in a hydrogen atmosphere at 2000° F. for one hour; was thereafter coined at 100,000 p.s.i.; and then tested in the above described machine using an opposing surface of 4130 steel, at 150 ft./min., and a surface load of 13.2 p.s.i. The material was brought up to a temperature of 1200° F. at which it had a coefficient of friction of 0.250. The machine was run continuously for four hours after which its coefficient of friction was 0.170. The material was then allowed to cool and after one hour of further running had a temperature of 150° F. and a coefficient of 0.375. This test cycle was repeated for a total of 24 hours giving an average friction coefficient of 0.170 at 1200° F. and 0.375 at 150° F.

In general it should be pointed out that coefficients of friction decrease with increasing speed; and further, with applicants' improved materials containing Mo and MgO, decrease with an increase in temperature. The above test is considered a severe one, and coefficients of friction below 0.170 have been obtained at speeds of 150 ft./min. and at elevated temperatures.

Applicants have further discovered that a still further lowering of the coefficient of friction and general increase in rigidity and wear life is obtained if the materials are flame sprayed upon suitable backing members. Powdered materials containing Mo and MgO cannot be flame sprayed by conventional practice; and special techniques and methods had to be devised in order to get the sprayed material to adhere to metallic backing plates.

Applicants' preferred flame spraying material and method of handling is as follows:

EXAMPLE II

A thorough mixture consisting of approximately 71.0% minus 325 mesh molybdenum powder, 24.0% minus 325 mesh iron powder, and 5.0% minus 200 mesh MgO was prepared for flame spraying. A Metalizing Company of America, model No. 384 spray gun had its air cap removed. A standard nozzle having a 3/16″ material handling orifice was bushed to reduce the material handling orifice size to 1/16″. The powder was placed in a bin and subjected to a nitrogen pressure of approximately 5 p.s.i. to produce a nitrogen flow of approximately 6 cubic feet of nitrogen per hour, and a powder consumption of approximately 15 grams/min. Oxygen and acetylene gases were used to produce the heating flame at a rate of approximately 32 cubic ft./hr. of $O_2$ and 39 cubic ft./hr. of acetylene. The tip of the gun was held approximately 5 inches away from the work and the temperature of the backup ring (work) was held at approximately 500° F. The backup ring was made from 1010 steel, although type 430, 416 and other stainless steels have been used. The rings are preferably sand blasted, or grooved by knurling, etc., before the material is flame sprayed thereon.

The ring was flame sprayed to a thickness of approximately 0.030 inch and then ground to leave a layer of approximately 0.015 inch thick. The backup member was then inserted in the above described test machine and tested for 24 hours. The material initially had a coefficient of friction at room temperature of approximately 0.510. After one hour its temperature was raised to 1200° F. at which it had a coefficient of 0.425. After the next hour at 1200° F. it had a coefficient of 0.270, and after five hours it had a coefficient of 0.185 at 1200° F. After 10 hours it had a coefficient of 0.150, and wear could not be detected after 24 hours of continuous operation.

Additional tests of articles are given in Table I below. In this table all of the materials tested were made according to the procedures outlined in Example II, excepting for the material of test D which was made substantially in accordance with the procedure outlined in Example I.

Table 1

| Tests | Rubbing Speed, f.p.m. | Temperature, °F. | Pressure, p.s.i. | Friction Coefficient, Dry | Amount of Wear | Total Running Time, Hours |
|---|---|---|---|---|---|---|
| A | 150 | 150 | 15 | .27 | None | 24 |
| B | 150 | 1,200 | 15 | .18 | None | 24 |
| C | 150 | 1,400 | 15 | .21 | None | 24 |
| D | 150 | 1,200 | 10 | .23 | None | 1,000 |
| E | 1,000 | 150 | 15 | .10 | None | 2 |
| F | 1,000 | 1,200 | 15 | .09 | None | 24 |
| G | 2,500 | 1,000 | 15 | .06 | None | 7 |
| H | 5,000 | 1,000 | 15 | .05 | .0002″ | 7 |
| I | 7,500 | 1,000 | 15 | .03 | .00005″ | 9 |

In applicants' work with the furnace sintered powdered material, it was found that the coefficients of friction increased generally as the particle size of the MgO was decreased below approximately 100 mesh. With the flame sprayed material, however, the coefficients and tendency to gall generally decreased as the particle size of the MgO was decreased below 100 mesh; and the best results were obtained with material of approximately minus 200 mesh. This is borne out by the following example where a flame sprayed material was tested having a larger MgO particle size than the preceding preferred embodiment:

EXAMPLE III

A specimen was prepared using the same procedure and materials outlined in Example II excepting that the particle size of the MgO was changed to −30 +90 mesh. This specimen was tested in the same machine and in the same manner as was the specimen described in Example II and the present specimen gave an average coefficient of friction at 1200° F. of 0.300, and at 120° F. of 0.385. Slight galling was evident.

Acceptable results can be had with materials whose composition varies from that of the above specimens as exhibited by the following examples:

EXAMPLE IV

A powder of the following composition was made and a flame sprayed specimen prepared in the manner outlined in Example II:

65% Mo having a particle size of less than 325 mesh.
30% Fe having a particle size of less than 325 mesh.
5% MgO having a particle size of less than 200 mesh.

This specimen gave a coefficient of friction at 1200° F. of .200, and a coefficient at 130° F. of .385 on 430 stainless steel.

EXAMPLE V

A powder of the following composition was made and a flame sprayed specimen prepared in the manner outlined in Example II:

75% Mo having a particle size of less than 325 mesh.
20% Fe having a particle size of less than 325 mesh.
5% MgO having a particle size of less than 200 mesh.

This specimen gave a coefficient of friction in 1200° F. of .200 and a coefficient at 130° F. of .335 on 430 stainless steel.

EXAMPLE VI

A powder of the following composition was made and a flame sprayed specimen prepared in the manner outlined in Example II:

64% Mo having a particle size of less than 325 mesh.
21% Fe having a particle size of less than 325 mesh.
15% MgO having a particle size of less than 200 mesh.

This specimen gave a coefficient of friction at 1200° F. of .300 and a coefficient at 140° F. of .335 on 430 stainless steel.

EXAMPLE VII

A powder of the following composition was made and a flame sprayed specimen prepared in the manner outlined in Example II.

52.5% Mo having a particle size of less than 325 mesh.
17.5% Fe having a particle size of less than 325 mesh.
30% MgO having a particle size of less than 200 mesh.

This specimen gave a coefficient of friction at 1200° F. of .335 and a coefficient at 140° F. of .435 on 430 stainless steel.

EXAMPLE VIII

A powder of the following composition was made and a flame sprayed specimen prepared in the manner outlined in Example II:

73% Mo having a particle size of less than 325 mesh.
24% Fe having a particle size of less than 325 mesh.
3% MgO having a particle size of less than 200 mesh.

This specimen gave a coefficient of friction at 1200° F. of .270 and a coefficient at 110° F. of .420 on 430 stainless steel.

Applicants have found that acceptable specimens cannot be prepared using convenitional flame spraying practice. In general, the material sprayed by conventional practice does not have as low a coefficient of friction, and is not as free from galling at room temperatures. Applicants have found that only by reducing the ratio of powdered material to acetylene to an amount which is approximately ⅓ that of conventional practice can good flame sprayed results be had. This ratio will therefore not substantially exceed 900 grams powder per 39 cubic feet of acetylene. Best results also are obtained when the nozzle is held closer to the work than with the usual practice, and 5 inches seems to be optimum.

In general, applicants have found that furnace sintered compositions which gave acceptable results also would give good results when flame sprayed.

The following Table II is a tabulation of pertinent data on some of the furnace sintered materials which have been tested and from which certain conclusions covered by the attached claims were drawn:

Table II

| Test No. | Composition | | | Coefficient of Friction | | Opposing Surface | Length of Run and Pressure | F.p.m. | Wear | Sintering Temperature, °F. | Amount Galling |
|---|---|---|---|---|---|---|---|---|---|---|---|
| | Mo | Fe | MgO | Hot, °F. | Cold, °F. | | | | | | |
| 1 | 0 | 100 | 0 | not heated | .595 @ 160 | 6,302 | 5 hr. @ 25 | 110 | .001 | 2,200 | slight. |
| 2 | 0 | 25 | 75 | do | .400 @ 120 | 6,302 | 15 hr. @ 16 | 80 | .034 | 1,600 | none. |
| 3 | 0 | 75 | 25 | do | .400 @ 105 | 6,302 | 14 hr. @ 16 | 80 | .004 | 1,600 | light. |
| 4 | 15 | 35 | 50 | do | .435 @ 100 | 6,302 | 15 hr. @ 16 | 80 | .014 | 1,600 | none. |
| 5 | 35 | 15 | 50 | do | .560 @ 130 | 6,302 | 11 hr. @ 16 | 80 | .004 | 1,600 | Do. |
| 6 | 71.3 | 23.7 | 5 | .180 @ 1,200 | .420 @ 140 | 4,130 | 3½ hr. @ 13.2 | 150 | none | 2,000 | light. |
| 7 | 47.5 | 47.5 | 5 | .270 @ 1,200 | .435 @ 150 | 4,130 | 3½ hr. @ 13.2 | 150 | none | 2,000 | moderate. |
| 8 | 23.7 | 71.3 | 5 | .240 @ 1,200 | .370 @ 160 | 4,130 | 3½ hr. @ 13.2 | 150 | .002 | 2,000 | Do. |
| 9 | 71.3 | 23.7 | 5 | not heated | .365 @ 100 | 6,302 | 5 hr. @ 25 | 110 | .001 | 1,800 | fine. |
| 10 | 67.5 | 22.5 | 10 | do | .390 @ 100 | 6,302 | 5 hr. @ 25 | 110 | none | 1,800 | Do. |
| 11 | 65.8 | 21.2 | 15 | do | .390 @ 190 | 6,302 | 5 hr. @ 25 | 110 | .001 | 1,800 | Do. |
| 12 | 60 | 20 | 20 | do | .330 @ 180 | 6,302 | 5 hr. @ 25 | 110 | .002 | 1,800 | slight. |
| 13 | 56.8 | 18.2 | 25 | do | .500 @ 185 | 6,302 | 5 hr. @ 25 | 110 | .005 | 1,800 | some. |
| 14 | 52.5 | 17.5 | 30 | do | .415 @ 190 | 6,302 | 5 hr. @ 25 | 110 | .001 | 1,800 | fine. |
| 15 | 70.7 | 23.4 | 4.9 | .190 @ 1,200 | .580 @ 120 | 4,130 | 3½ hr. @ 13.2 | 150 | .002 | 1,800 | light. |
| 16 | 69.9 | 23.2 | 4.9 | .240 @ 1,200 | .580 @ 130 | 4,130 | 3½ hr. @ 13.2 | 150 | .001 | 1,800 | Do. |
| 17 | 67.8 | 22.5 | 4.9 | .240 @ 1,200 | .600 @ 110 | 4,130 | 3½ hr. @ 13.2 | 150 | .004 | 1,800 | Do. |

The following examples show that the inclusion of MgO in sintered powdered metal bearings and seals gives beneficial results at both the elevated and room temperatures:

EXAMPLE IX

A bearing material was made using a thoroughly mixed powder consisting of:

80% by weight Fe powder of minus 80 mesh, and
20% by weight MgO particles of minus 325 mesh.

The powder was pressed at 40,000 p.s.i. sintered at 2050° F. The material was thereafter infiltrated with copper and subjected to a dry reciprocatory friction test at a load of 30,000 p.s.i. The material was run in with molybdenum-disulfide for 10 minutes after which the material exhibited a maximum static friction at 150° F. of 0.15, and a maximum dynamic coefficient at the same temperature of 0.10. The material was run for 250,000 cycles at 30,000 p.s.i. load after which it had 0.003 of an inch wear. The maximum compressive strength of such a material is approximately 215,000 p.s.i.

EXAMPLE X

Another bearing material was made using a thoroughly mixed powder consisting of:

50% by weight of Fe powder of minus 80 mesh, and 50% by weight of MgO particles of minus 325 mesh.

The mixed material was pressed at 40,000 p.s.i., sintered at 2050° F. The material was thereafter infiltrated with copper. The copper infiltrated material was heated to 1550° F. and quenched in oil. This material absorbed an amount of oil equal to approximately 8% of its volume. The bearing material was subjected to an otherwise nonlubricated reciprocatory friction test at a load of 5,000 p.s.i., at 30 cycles per second. The material ran 3,000,000 cycles before failure, exhibited no wear, and gave a maximum static coefficient of friction of 0.25. A bronze "oilite" material was inoperable due to high wear and high friction when operated under similar conditions. Bronze "oilite" material has the highest PV load factor of any of the oilites (75,000). An oilite material consisting of 75 Fe, 25 Cu has a PV load factor of only 50,000. An oilite material of 75 Fe, 25 Cu is close in composition to applicants' material excepting for the inclusion of the MgO particles; and it is therefore evident that applicants' improved results are attributable at least in part to MgO.

While the invention has been described in considerable detail, we do not wish to be limited to only those composions shown and described, and it is our intention to cover hereby all novel compositions, articles and methods of manufacture which fall within the teachings of this specification and which are covered by the following claims.

We claim:

1. A pair of non galling essentially metallic surfaces for smooth rubbing contact at elevated temperatures, one of said surfaces including: from approximately 3% to approximately 75% by weight of MgO particles not substantially larger than approximately 20 mesh and not substantially smaller than approximately 325 mesh, generally uniformly distributed throughout and supported by a sintered powdered metal matrix for supporting the MgO particles and for providing lubrication to the other one of said pair of surfaces said matrix comprising molybdenum and iron in the ratio of approximately 3 to 1.

2. A pair of non galling essentially metallic surfaces for smooth rubbing contact at elevated temperatures, one of said surfaces including: a thoroughly mixed and sintered powdered material having more than approximately 3% by weight of MgO particles not substantially larger than 20 mesh and not substantially smaller than approximately 325 mesh, more than approximately 20% by weight of Fe particles not substantially larger than 80 mesh, and more than approximately 10% by weight of Mo particles not substantially larger than 80 mesh.

3. A pair of non galling essentially metallic surfaces for smooth rubbing contact at elevated temperatures, one of said surfaces including a thoroughly mixed, pressed and furnace sintered powdered material consisting essentially of; approximately 71% by weight of powdered molybdenum particles not substantially larger than 80 mesh, approximately 24% by weight of powdered iron particles not substantially larger than 80 mesh, and approximately 5% by weight of magnesium oxide particles not substantially larger than 20 mesh nor smaller than 200 mesh.

4. A pair of non galling essentially metallic surfaces for smooth rubbing contact at elevated temperatures, one of said surfaces being formed by the flame spraying onto a support of a thoroughly mixed and sintered powdered material consisting essentially of: a thoroughly mixed, flame sprayer powdered material consisting essentially of approximately 71% by weight of powdered molybdenum particles not substantially larger than 200 mesh, approximately 24% by weight of powdered iron particles not substantially larger than 100 mesh, and approximately 5% by weight of magnesium oxide particles not substantially larger than 200 mesh.

5. A pair of non galling essentially metallic surfaces for smooth rubbing contact at elevated temperatures, one of said surfaces comprising: a metallic backup member having a flame sprayed antifriction surface thereon of an intimate mixture consisting essentially of; more than approximately 3% by weight of MgO particles not substantially larger than 200 mesh, more than approximately 10% by weight of Mo particles not substantially larger than 200 mesh, and more than approximately 20% by weight of Fe particles not substantially larger than 100 mesh.

6. A pair of non galling essentially metallic surfaces for smooth rubbing contact at elevated temperatures, one of said surfaces comprising: a metallic backup member having a flame sprayed antifriction surface thereon of an intimate mixture consisting essentially of approximately 5% by weight of MgO particles not substantially larger than 200 mesh, of approximately 71% by weight of Mo particles not substantially larger than 200 mesh, and of approximately 24% by weight of Fe particles not substantially larger than 100 mesh.

7. A pair of non galling essentially metallic surfaces for smooth rubbing contact at elevated temperatures, one of said surfaces comprising: a carbon steel backup member having a flame sprayed antifriction surface thereon of an intimate mixture consisting essentially of approximately 5% by weight of MgO particles not substantially larger than 200 mesh, of approximately 71% by weight of Mo particles not substantially larger than 200 mesh, and of approximately 24% by weight of Fe particles not substantially larger than 100 mesh.

8. A pair of non galling essentially metallic surfaces for smooth rubbing contact at elevated temperatures, one of said surfaces comprising: a stainless steel backup member having a flame sprayed antifriction surface thereon of an intimate mixture consisting essentially of approximately 5% by weight of MgO particles not substantially larger than 200 mesh, of approximately 71% by weight of Mo particles not substantially larger than 200 mesh, and of approximately 24% by weight of Fe particles not substantially larger than 100 mesh.

9. A pair of non galling essentially metallic surfaces for smooth rubbing contact at elevated temperatures, one of said surfaces including: from approximately 3% to approximately 75% by weigh of MgO particles not substantially larger than approximately 20 mesh and not substantially smaller than approximately 325 mesh generally uniformly distributed throughout and supported by an essentially metallic matrix which firmly grips and holds said MgO particles for their support of the other one of said pair of opposing sliding surfaces, said matrix including a readily oxidizable form of molybdenum in a sufficient amount to provide a continuous supply of oxides of molybdenum at the temperature at which the material is to be used to lubricate the sliding surfaces, and said essentially metallic matrix also including a metal of the group of metals which alloy with molybdenum to decrease the sublimation rate of said oxides of molybdenum.

10. A pair of non galling essentially metallic surfaces for smooth rubbing contact at elevated temperatures, one of said surfaces including: from approximately 3% to approximately 75% by weight of MgO particles not substantially larger than approximately 20 mesh and not substantially smaller than approximately 325 mesh generally uniformly distributed throughout and supported by a metallic matrix which firmly grips and holds said MgO particles for their support of the other one of said pair of opposing sliding surfaces, said matrix including a readily oxidizable form of molybdenum in a sufficient amount to provide a continuous supply of oxides of molybdenum at the temperature at which the material is to be used to lubricate the sliding surfaces, and said matrix also including a stainless steel which alloys with said molybdenum to increase its strength and decrease the sublimation rate of its oxides.

11. A pair of non galling essentially metallic surfaces for smooth rubbing contact at elevated temperatures, one of said surfaces including: from approximately 3% to approximately 75% by weight of MgO particles not substantially larger than approximately 20 mesh and not substantially smaller than approximately 325 mesh generally uniformly distributed throughout and supported by a metallic matrix which firmly grips and holds said MgO particles for their support of the other one of said pair of opposing sliding surfaces, said matrix including a readily oxidizable form of molybdenum in a sufficient amount to provide a continuous supply of oxides of molybdenum at the temperature at which the material is to be used to lubricate the sliding surfaces, and said matrix also including nickel which alloys with said molybdenum to increase its strength and decrease the sublimation rate of its oxides.

12. A new and improved method of forming a non galling essentially metallic surface for rubbing contact with another metal surface at elevated temperatures comprising: providing a metallic backup member, suitably roughing up a surface of said backup member and flame spraying a powder mixture having more than approximately 3% MgO particles, more than approximately 10% Mo particles, and more than approximately 20% Fe particles on the rubber surface of the backup member using a powder to acetylene ratio of not substantially more than 900 grams/39 cu. ft.

13. A new and improved method of forming a high temperature self lubricating bearing, sealing structure comprising: providing a metallic backup member, suitably roughing up a surface of said backup member, and flame spraying a powder mixture of more than approximately 3% MgO particles not substantially larger than 200 mesh, more than approximately 10% Mo particles not substantially larger than 200 mesh, and more than approximately 20% Fe particles not substantially larger than 100 mesh, on the rubbing surface of the backup number with a spray gun held at approximately 5 inches from the work using an oxyacetylene flame and a powder to acetylene ratio of not more than approximately 900 grams/39 cu. ft.

14. A new and improved method of forming a high temperature self lubricating bearing, sealing structure comprising: providing a metallic backup member, suitably roughing up a surface of said backup member, and flame spraying a powder consisting essentially of approximately 5% MgO particles not substantially larger than 200 mesh, approximately 71% Mo particles not substantially larger than 200 mesh, and approximately 24% Fe particles not substantially larger than 100 mesh, on the rubbing surface of the backup member with a spray gun held at approximately 5 inches from the work using an oxyacetylene flame and a powder to acetylene ratio of not substantially more than 900 grams/39 cu. ft.

15. A new and improved method of forming a high temperature self lubricating bearing, sealing structure comprising: providing a metallic backup member, suitably roughing up a surface of said backup member, and flame spraying a powder mixture having more than approximately 3% MgO particles not substantially larger than 200 mesh, more than approximately 10% Mo particles not substantially larger than 200 mesh, and more than approximately 20% Fe particles not substantially larger than 100 mesh, on the rubbing surface of the seal using a spray gun having a $\frac{1}{16}''$ material flow nozzle held at approximately 5 inches from the work and using an oxygen flow rate of approximately 32 cubic ft./hr., an acetylene flow rate of approximately 39 cubic ft./hr. and a powder flow rate of approximately 15 grams/min.

16. A new and improved method of forming a high temperature self lubricating bearing, sealing structure comprising: providing a metallic backup member, suitably roughing up a surface of said backup member, and flame spraying a powder mixture consisting essentially of approximately 5% MgO particles not substantially larger than 200 mesh, approximately 71% Mo particles not substantially larger than 200 mesh, and approximately 24% Fe particles not substantially larger than 100 mesh, on the rubbing surface of the backup member using a spray gun having a $\frac{1}{16}''$ material flow nozzle held at approximately 5 inches from the work and using an oxygen flow rate of approximately 32 cubic ft./hr., an acetylene flow rate of approximately 39 cubic ft./hr. and a powder flow rate of approximately 15 grams/min.

17. A new and improved method of forming a high temperature self lubricating bearing, sealing structure comprising: providing a stainless steel backup member, suitably roughing up a surface of said backup member, and flame spraying a powder mixture consisting essentially of approximately 5% MgO particles not substantially larger than 200 mesh, approximately 71% Mo particles not substantially larger than 200 mesh, and approximately 24% Fe particles not substantially larger than 100 mesh, on the rubbing surface of the backup member using a spray gun held at approximately 5 inches from the work using an oxyacetylene flame and a powder to acetylene ratio of not substantially more than 900 grams/39 cu. ft.

18. A new and improved method of forming a high temperature self lubricating bearing, sealing structure comprising: providing a stainless steel backup member, suitably roughing up a surface of said backup member, and flame spraying a powder mixture consisting essentially of approximately 5% MgO particles not substantially larger than 200 mesh, approximately 71% Mo particles not substantially larger than 200 mesh, and approximately 24% Fe particles not substantially larger than 100 mesh, on the rubbing surface of the backup member using a spray gun having a $\frac{1}{16}''$ material flow nozzle held at approximately 5 inches from the work using an oxygen flow rate of approximately 32 cubic ft./hr., an acetylene flow rate of 39 cubic ft./hr. and a powder flow rate of approximately 15 grams/min.

References Cited in the file of this patent
UNITED STATES PATENTS

| | | |
|---|---|---|
| 2,707,691 | Wheildon | May 3, 1955 |
| 2,775,531 | Montgomery et al. | Dec. 25, 1956 |
| 2,798,577 | La Forge | July 9, 1957 |
| 2,823,139 | Schulze et al. | Feb. 11, 1958 |
| 2,904,449 | Bradstreet | Sept. 15, 1959 |

UNITED STATES PATENT OFFICE
CERTIFICATE OF CORRECTION

Patent No. 3,055,769                 September 25, 1962

Robert H. Herron et al.

It is hereby certified that error appears in the above numbered patent requiring correction and that the said Letters Patent should read as corrected below.

Column 3, line 11, for "that" read -- the --; column 6, line 15, for "convenitional" read -- conventional --; column 7, lines 28 and 29, for "composions" read -- compositions --; column 8, line 50, for "weigh" read -- weight --; column 9, lines 46 and 47, for "number" read -- member --.

Signed and sealed this 26th day of March 1963.

(SEAL)
Attest:

ESTON G. JOHNSON                          DAVID L. LADD
Attesting Officer                           Commissioner of Patents